United States Patent
Morales (10) Patent No.: US 8,233,160 B2
(45) Date of Patent: Jul. 31, 2012

(54) AUTOMATIC ROTATED ROW PLACEMENT IN MULTIUP IMPOSITION

(75) Inventor: Javier A. Morales, Irondequoit, NY (US)

(73) Assignee: Xerox Corporation, Norwalk, CT (US)

( * ) Notice: Subject to any disclaimer, the term of this patent is extended or adjusted under 35 U.S.C. 154(b) by 1099 days.

(21) Appl. No.: 11/765,641

(22) Filed: Jun. 20, 2007

(65) Prior Publication Data

US 2008/0316535 A1 Dec. 25, 2008

(51) Int. Cl.
*G06F 3/12* (2006.01)
(52) U.S. Cl. ............... 358/1.13; 358/1.18; 358/1.14; 358/1.15; 358/1.4; 358/3.27; 715/276; 715/243; 382/156; 382/217
(58) Field of Classification Search ............ 358/1.13
See application file for complete search history.

(56) References Cited

U.S. PATENT DOCUMENTS

| 5,995,719 | A | 11/1999 | Bourdead'hui et al. ...... 395/111 |
| 6,976,797 | B2 | 12/2005 | Herron .......................... 400/61 |
| 2004/0095587 | A1* | 5/2004 | Brown et al. ................. 358/1.2 |
| 2005/0152000 | A1 | 7/2005 | Van de Capelle et al. ... 358/1.18 |
| 2007/0127073 | A1* | 6/2007 | Goel et al. ................... 358/1.18 |

* cited by examiner

*Primary Examiner* — Twyler Haskins
*Assistant Examiner* — Brendan McCommas
(74) *Attorney, Agent, or Firm* — Kermit D. Lopez; Luis M. Ortiz; Tuesday A. Kaasch (57) ABSTRACT

A system and method for automatically placing a rotated row in a multi-up imposition. Calculations can be performed, which are required to execute an automated multi-up imposition. The dimensions of the input document can be then evaluated against the available area in the imposed layout to determine whether there is sufficient space to add a rotated row to the layout (e.g., the "Dutch Row" in Dutch imposition). If it is determined that there is sufficient space for a rotated row, a rotated page row can then be added to the imposed layout.

17 Claims, 7 Drawing Sheets

AUTOMATIC ROTATED ROW PLACEMENT IN MULTIUP IMPOSITION

TECHNICAL FIELD

Embodiments are generally related to data-processing systems and methods. Embodiments are also related to electronic rending devices and systems. Embodiments are additionally related to imposition techniques, devices and systems.

BACKGROUND OF THE INVENTION

Imposition is generally the process of arranging pages correctly prior to printing. Imposition is also used to make better use of larger sheets of paper when printing small documents. This can be achieved by placing one or more documents multiple times on the same page.

In recent years, the process of imposition has been automated by computers and is sometimes referred to as "digital stripping". An entire book may be imposed and many complex functions applied in an instant. Binding options may be changed "on the fly" and impositions produced to multiple output devices simultaneously, often with no user-intervention at all.

In one prior art implementation, imposition is the pre-press process of arranging pages on the same sheet, in such a manner that a proper sequence or position of each page relative to the other pages on the sheet is achieved. Arranging the pages is required because, when for example, a book or a leaflet is manufactured, several pages of the book or leaflet may be printed by the printing press on the same sheet. After printing, the sheet is folded and possibly cut and bound together with other processed sheets. In the resulting book or leaflet, the pages must follow one another in a correct order; this is a job of the imposition process. Thus, the pre-press process of imposition is performed in view of post-press processes such as fold and cut operations.

An imposition plan represents a layout according to which the individual pages are arranged on a sheet, possibly including relevant dimensions, such as, for example, the dimensions of the sheet, the dimensions of the individual pages and the dimensions of the spaces at the borders and between the individual pages on the sheet. To determine an imposition plan, several types of data need to be taken into account, such as the size of the sheet, the size of the individual pages, the possibilities of the press and of the folding machine to be used.

It is customary to use a set of predefined imposition plans, often called imposition templates, to determine an imposition plan. Such a predefined imposition plan or imposition template typically provides the layout of the individual pages on the sheet without dimensions. To select a suitable imposition template for a particular print job, a user may be assisted by a computer program that presents the user with a set of imposition templates. The user can then select an imposition template and add the relevant dimensions to the selected imposition template; usually the user is also assisted in this step by the computer program.

Current automated multi-up implementations enable efficient imposition by proving a means for imposing documents of many different dimensions utilizing a single set of imposition parameters. While providing a means of prepress automation, current implementations of automated multi-up impositions are limited to placing all imposed pages in the same orientation. This limitation prevents the use of automated multi-up imposition on documents that require use of "Dutch imposition" to ensure efficient use of media. Further, automated prepress processing should identify the jobs that require Dutch imposition and should also possess the ability to be optionally imposed manually. It is believed that the methods and systems disclosed herein offer a solution to these problems.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved data-processing systems and methods.

It is another aspect of the present invention to provide for an automatic rotated row placement in a multi-up imposition.

The aforementioned aspects and other objectives and advantages can now be achieved as described herein. A system and method for automatically placing a rotated row in multi-up imposition is disclosed. Calculations can be performed, which are generally required to execute an automated multi-up imposition. The dimensions of the input document can be then evaluated against the available area in the imposed layout to determine whether there is sufficient space to add a rotated row to the layout (i.e., the "Dutch Row" in Dutch imposition). If it is determined that there is sufficient space for a rotated row, a rotated page row can be added to the imposed layout.

The imposed layout dimensions, required page cell dimensions and number of columns and rows of imposed documents can be calculated for executing automatic multi-up imposition. The page cells of same orientation can be placed in the imposed layout. An operation can be performed to determine whether sufficient space is available for adding a rotated row in the layout. A rotated row can be added if sufficient space is available. After adding a rotated row, an operation can be performed/processed to the number of rotated page cells that can fit into the rotated row and places. The number of page cells can be then placed in the rotated row.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

Software modules generally include instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module is module 111 depicted in FIG. 1.

It is important to note that, although the embodiments are described in the context of a fully functional data-processing system (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links. The logical operation steps depicted in FIG. 5, FIG. 6A and FIG. 6B can, for example, be implemented in the context of such a software module.

Figure 1:
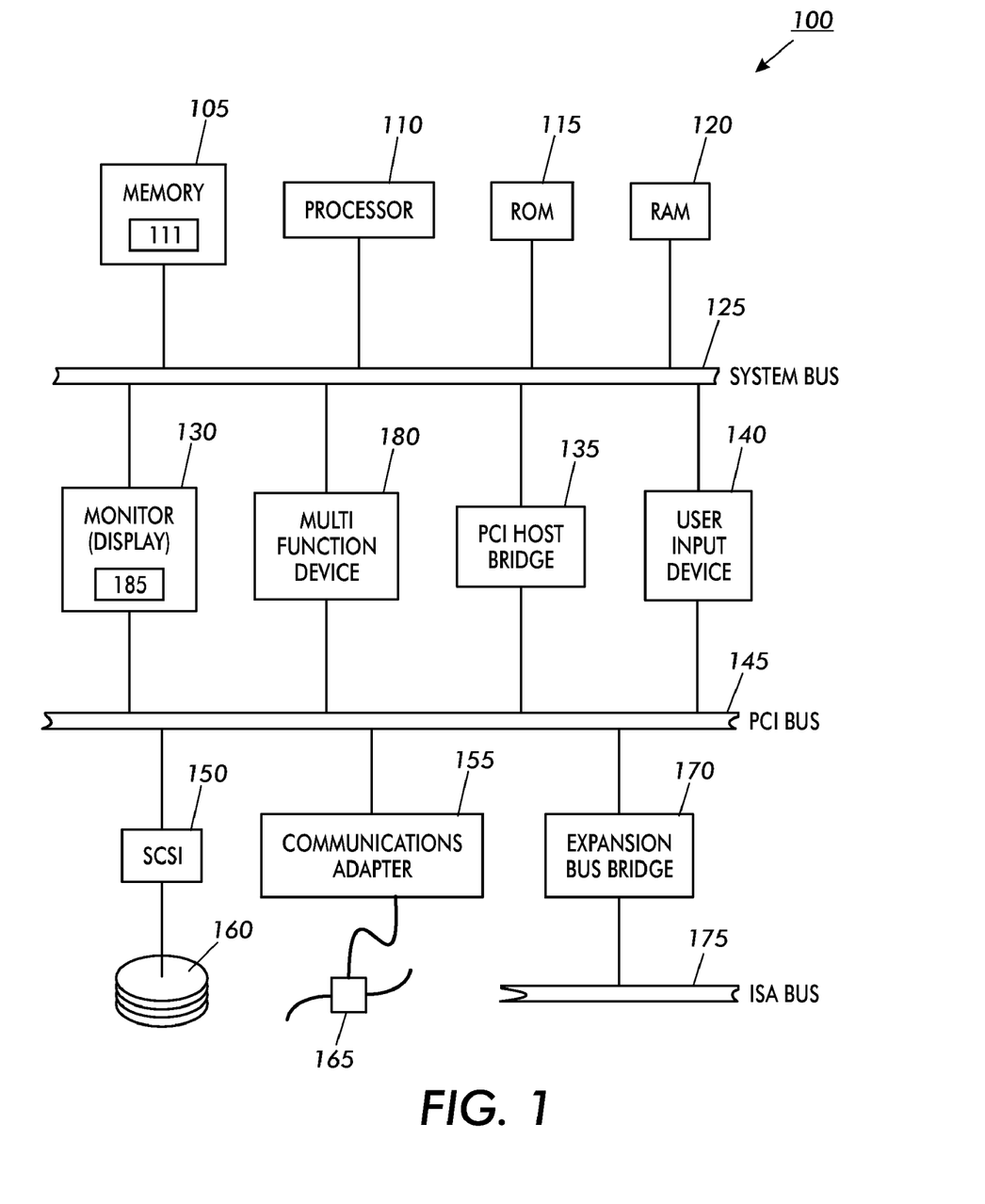
FIG. 1 illustrates a block diagram of a data-processing system, which can be utilized for automatic rotated row placement in multi-up imposition, in accordance with a preferred embodiment.

Referring to the drawings and in particular to FIG. 1, there is depicted a data-processing apparatus 100 which can be utilized for automatically placing a rotated row in a multi-up imposition, in accordance with a preferred embodiment. Data-processing apparatus 100 represents one of many possible data-processing and/or computing devices, which can be utilized in accordance with the disclosed embodiments. It can be appreciated that data-processing apparatus 100 and its components are presented for generally illustrative purposes only and do not constitute limiting features of the disclosed embodiments.

As shown in FIG. 1, a memory 105, a processor (CPU) 110, a Read-Only memory (ROM) 115, and a Random-Access Memory (RAM) 120 are generally connected to a system bus 125 of apparatus 100. Memory 105 can be implemented as a ROM, RAM, a combination thereof, or simply a general memory unit. Module 111 can be stored within memory 105 and then retrieved and processed via processor 110 to perform a particular task. A user input device 140, such as a keyboard, mouse, or another pointing device, can be connected to PCI (Peripheral Component Interconnect) bus 145. A multi function device 180, which can combine several core technologies, including image scanning, document printing, and fax signaling, into a single unit, can also be connected to PCI bus 145.

Data-processing system thus includes CPU 110, ROM 115, and RAM 120, which are also coupled to Peripheral Component Interconnect (PCI) local bus 145 of data-processing apparatus 100 through PCI host-bridge 135. PCI Host Bridge 135 provides a low latency path through which processor 110 may directly access PCI devices mapped anywhere within bus memory and/or input/output (I/O) address spaces. PCI Host Bridge 135 also provides a high bandwidth path for allowing PCI devices to directly access RAM 120.

Also attached to PCI local bus 145 are communications adapter 155, small computer system interface (SCSI) 150, and expansion bus-bridge 170, communications adapter 155 is utilized for connecting data-processing apparatus 100 to a network 165. SCSI 150 is utilized to control high-speed SCSI disk drive 160. Expansion bus-bridge 170, such as a PCI-to-ISA bus bridge, may be utilized for coupling ISA bus 175 to PCI local bus 145. Note that PCI local bus 145 can further be connected to a monitor 130, which functions as a display (e.g., a video monitor) for displaying data and information for a user and for interactively displaying a graphical user interface (GUI) 185.

Note that the term "GUI" generally refers to a type of environment that represents programs, files, options and so forth by means of graphically displayed icons, menus, and dialog boxes on a computer monitor screen. A user can interact with the GUI 185 to select and activate such options by pointing and clicking with a user input device such as, for example, a pointing device such as a mouse, and/or with a keyboard. A particular item can function in the same manner to the user in all applications because the GUI 185 provides standard software routines (e.g., module 111) to handle these elements and reports the user's actions.

Figure 2:
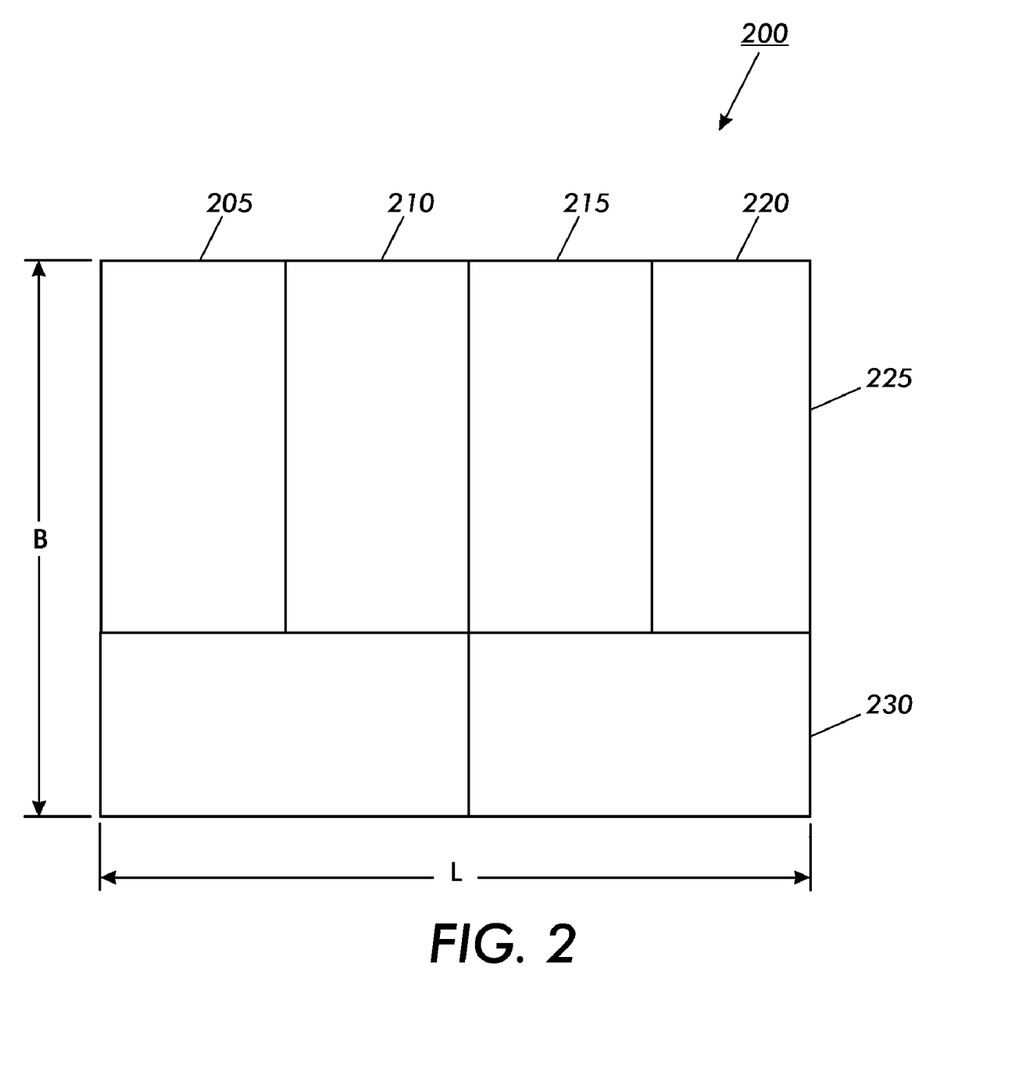
FIG. 2 illustrates a layout of imposed document depicting rows and columns for accommodating page cells, which can be implemented in accordance with a preferred embodiment.

FIG. 2 illustrates a layout 200 of an imposed document. The layout 200 depicted in FIG. 2 illustrates rows and columns for accommodating page cells, which can be implemented in accordance with an alternative embodiment. The module 111 of data-processing apparatus 100 depicted in FIG. 1 divides the imposed layout 200 into a number of rows 225 and 230 and columns 205, 210, 215 and 220 for accommodating page cells (not shown) of same and rotated orientation. The length L and breadth B represents the dimensions of the layout 200. The rows 225 and 230 can generally include columns 205, 210, 215 and 220.

Figure 3:
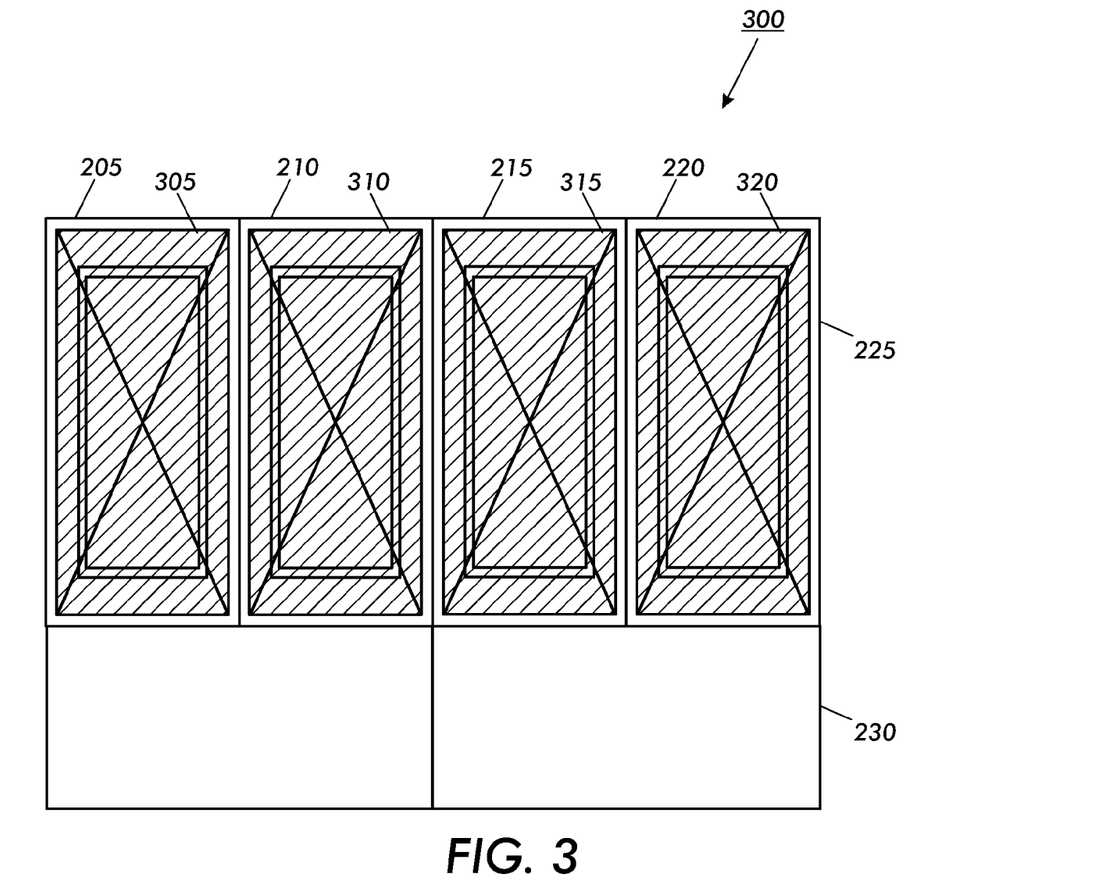
FIG. 3 illustrates a layout of imposed document depicting arrangement of page cells in same orientation, in accordance with a preferred embodiment.

FIG. 3 illustrates a layout 300 of an imposed document. The layout 300 illustrated in FIG. 3 depicts an arrangement of page cells of same orientation, in accordance with an alternative embodiment. Note that in FIG. 2 and FIG. 3, identical or similar parts or elements are indicated by identical reference numerals. Thus, the layout 300 depicted in FIG. 3 also contains the rows 225 and 230 and columns 205, 210, 215 and 220. The page cells 305, 310, 315 and 340 each possess the same orientation. The module 111 of data-processing apparatus 100 depicted in FIG. 1 arranges the page cells 305, 310, 315 and 340 in row 225. The page cells 305, 310, 315 and 340 can be of same or different dimensions, depending upon design considerations.

Figure 4:
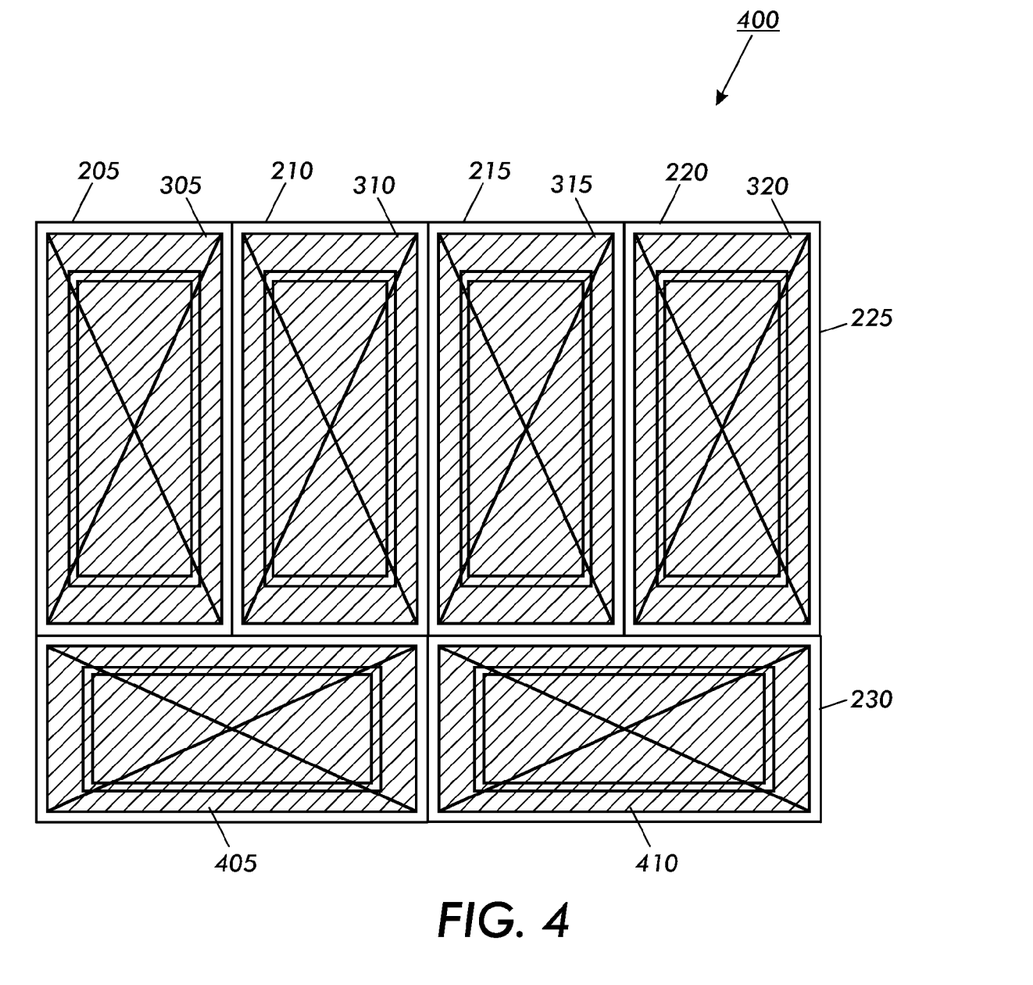
FIG. 4 illustrates a layout of imposed document depicting arrangement of page cells in same orientation and rotated page cells, in accordance with a preferred embodiment.

FIG. 4 illustrates a layout 400 of an imposed document in accordance with an alternative embodiment. The layout 400 depicted in FIG. 4 illustrates an arrangement of page cells in the same and rotated orientation. Note that in FIG. 3 and FIG. 4, identical or similar parts or elements are indicated by identical reference numerals. Thus, FIG. 4 also contains the rows 225 and 230, columns 205, 210, 215 and 220 and page cells 305, 310, 315 and 340. The module 111 of data-processing apparatus 100 depicted in FIG. 1 arranges the rotated page cells 405 and 410 in row 230. The page cells 305, 310, 315, 340, 405 and 410 can be of same or different dimensions.

Figure 5:
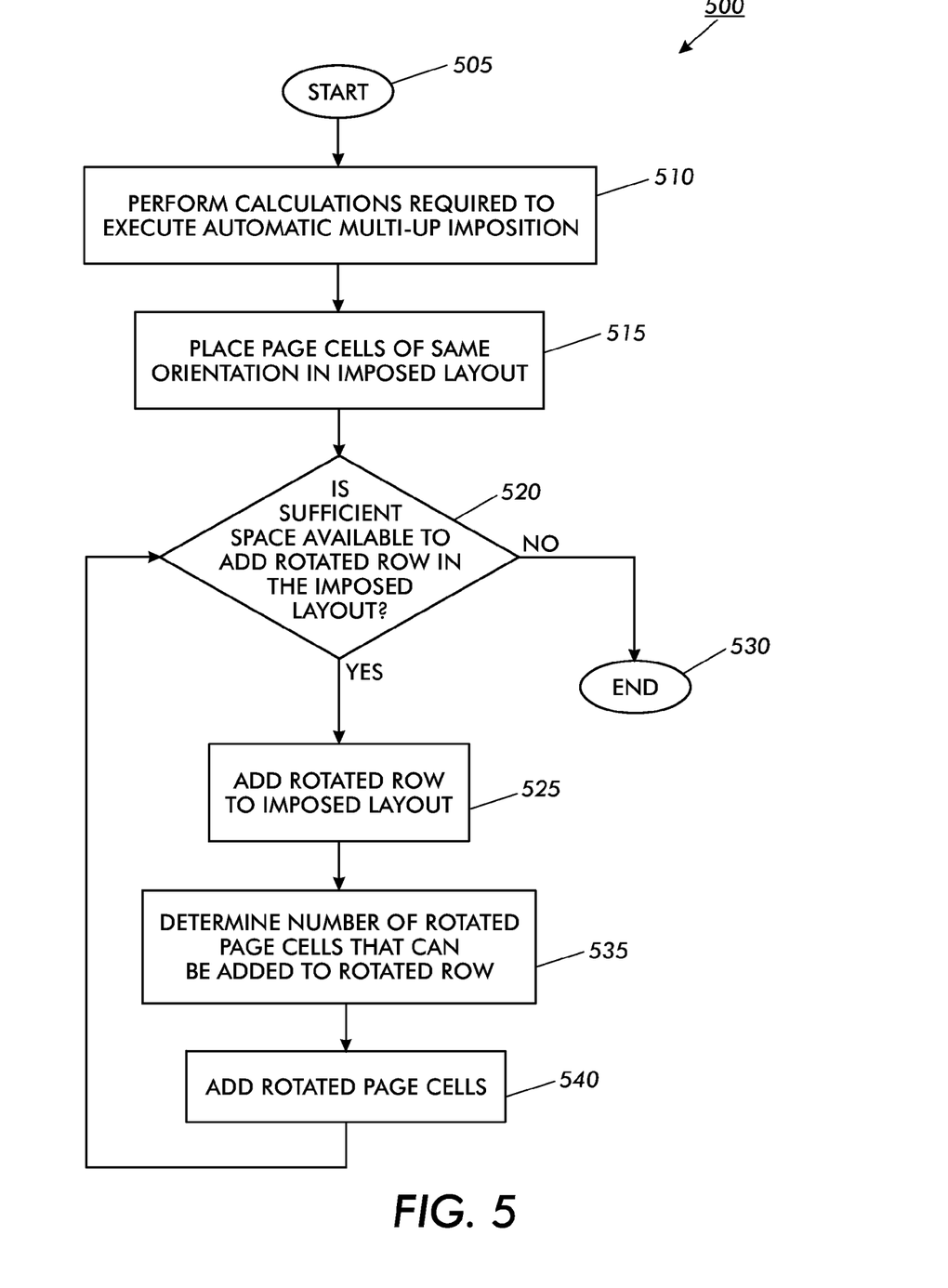
FIG. 5 illustrates a high level flow chart of operations illustrating logical operational steps of a method for automatic rotated row placement in multi-up imposition, in accordance with a preferred embodiment.
Figure 6:
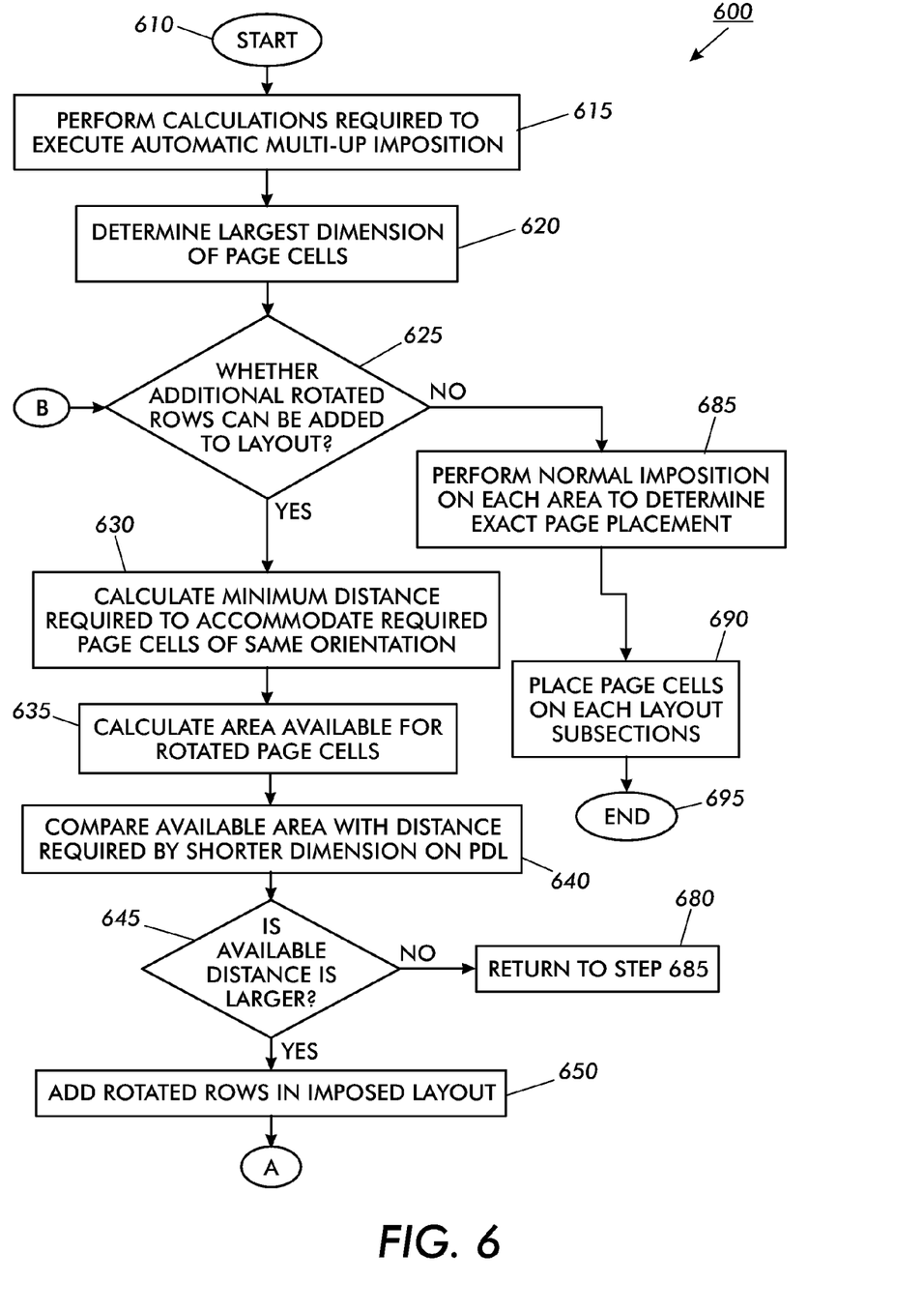
FIGS. 6-7 illustrate detailed flow charts depicting logical operational steps of a method for automatic rotated row placement in multi-up imposition, in accordance with a preferred embodiment.

FIG. 5 illustrates a high-level flow chart of operations illustrating logical operational steps of a method 500 for automatic rotated row placement in a multi-up imposition, in accordance with a preferred embodiment. Note that the operations or instructions of method 500 depicted in FIG. 5 can be implemented by one or more software modules, such as, for example, the module 111 of data-processing apparatus 100 depicted in FIG. 1. The automatic imposition process starts as indicated at block 505. The imposed layout dimensions, required page cell dimensions and number of columns and rows of imposed documents can be calculated for executing automatic multi-up imposition as depicted at block 510. The page cells of same orientation can be placed in imposed layout as illustrated at block 515.

Then, as said at block 520, the data-processing apparatus 100 depicted at FIG. 1 checks whether sufficient space is available for adding a rotated row in the layout. The data-processing apparatus 100 adds a rotated row as depicted at block 525, if sufficient space is available for adding a rotated row else the imposition process ends as depicted at block 530. After adding a rotated row the system determines the number of rotated page cells that can fit into the rotated row as indicated at block 535. Then the determined number of rotated page cells can be placed in the rotated row as described at block 540. Finally the system returns to the step 520 for checking the availability of space to add another rotated row in the layout.

Figure 7:
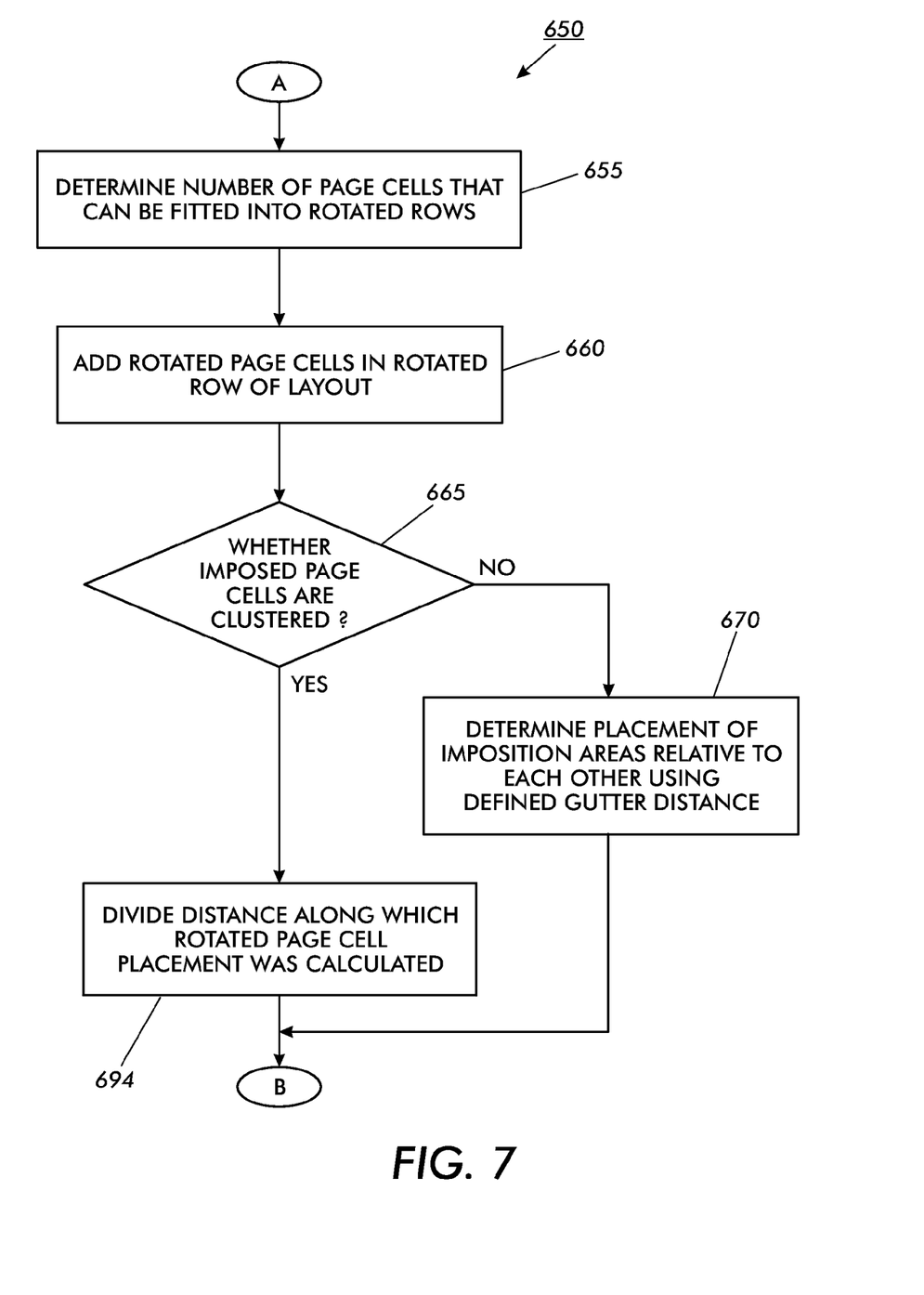

FIGS. 6-7 illustrates detailed flow chart depicting respectively logical operational steps of a method 600 and a method 650 for automatic rotated row placement in a multi-up imposition, in accordance with a preferred embodiment. Note that the operations or instructions of methods 600, 650 can be processed and implemented via a software module, such as, for example, module 111 of the data-processing apparatus 100 illustrated in FIG. 1. Additionally, such a module can implement a computer program product for automatically placing a rotated row in a multi-up imposition. Such a computer program product generally includes a computer-readable storage medium having computer-readable program code means embodied in said medium.

The automatic imposition process generally begins, as indicated at block 615. The imposed layout dimensions, required page cell dimensions and number of columns and rows of imposed documents can be calculated for executing automatic multi-up imposition as depicted at block 615. The required page cell dimension can be calculated as the width or height of the input document plus gutter, bleed and other imposition parameter requirements. The number of rows and columns in an imposed document generally represents the space for accommodating page cells of same or different dimensions. The largest dimension of the page cells can be determined as depicted at block 620.

As described at block 625, the data-processing apparatus 100 depicted in FIG. 1 check whether any additional rows can be added to the layout. If the data-processing apparatus 100 determines that additional rows can be added to the layout, a minimum distance required to accommodate required page cells of same orientation can be calculated as indicated at block 630. Otherwise, a normal imposition process can be performed on each area for determining exact page placement as described at block 685. After performing normal imposition, the page cells can be placed on layout subsections as indicated at block 690. Finally, the process ends as depicted at block 695.

After calculating the minimum distance as illustrated at block 630, the available area for rotated page cells can be calculated as depicted at block 635. Next, as indicated at block 640 the available area for rotated rows can be calculated by subtracting the calculated minimum distance from layout distance on the same direction. As described thereafter at block 640 the distance potentially available for rotated page cells can be calculated by comparing the calculated available area with the distance required by shorter dimension on PDL (Page Description Language). The data-processing apparatus 100 checks whether available distance for rotated page cell is larger as indicated at block 645. Next, if the available area is larger, as depicted at block 650, a rotated row can be added to the imposed layout. Otherwise, the process continues and processes the operation depicted at block 685 following processing of the operation depicted at block 680.

After adding a rotated row, the number of page cells that can fit into the rotated row can be determined as illustrated next at block 655. The number of page cells that can fit into the rotated row can be determined by dividing the available distance on the imposed document by distance required by the longest side of the page cells. The resultant integer can be utilized to determine the number of rotated page cells that can fit into the available area.

Thereafter, as described at block 660, the determined rotated page cells can be placed in the rotated row based on the number of page cells that can fit into the rotated row. The data-processing apparatus 100 determines whether the imposed page cells are clustered or distributed as indicated at block 665. If the page cells are clustered, the placement of imposition areas relative to each other can be determined utilizing a defined gutter distance as illustrated at block 670. Otherwise as depicted at block 694, the distance along which the rotated page cell placement was calculated can be divided based on the proportion of page layout that each section of the layout represents. For example, if the rotated page cells compose 15% of the vertical distance of the imposed layout, then those page cells are distributed (spread out) over 15% of the media. Finally the data-processing apparatus 100 returns to perform the operation depicted at block 625 for checking whether additional rows can be added to the layout.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for automatically placing a rotated row in a multi-up imposition, comprising:

calculating dimensions for an imposition layout, a plurality of rectangular page cells arranged into and a plurality of rows and columns, wherein said plurality of page cells are of a same orientation;

analyzing said dimensions to determine whether a row of rotated page cells can be added to said imposition layout wherein analyzing said dimensions to determine whether said row of rotated page cells can be added to said imposition layout further comprises:
  determining a largest dimension of said plurality of page cells;
  calculating a minimum distance required to accommodate said plurality of page cells of a same orientation;
  calculating an area available for accommodating said rotated page cells by subtracting said minimum distance from said layout distance on said orientation;
  calculating an available distance for placing a row of rotated page cells by comparing said area with distance required by shorter dimension of a page description language; and
  analyzing whether said available distance is large enough to add said row of rotated page cells; and
  placing said row of rotated page cells and said plurality of page cells of a same orientation in said imposition layout.

2. The method of claim 1 wherein determining said number of said plurality of rotated page cells that can fit into said rotated row further comprises:
  dividing an available distance on said imposed document by a distance required by the longest side of said plurality of page cells; and
  determining number of said plurality of rotated page cells that can fit into said area.

3. The method of claim 1 further comprising:
  determining a placement of a plurality of imposition areas relative to each other utilizing a defined gutter distance if said plurality of page cells are clustered; and
  dividing a distance along which said plurality of rotated page cells placement was calculated based on a proportion of a page layout that each section of said imposition layout represents.

4. The method of claim 3 wherein determining said number of said plurality of rotated page cells that can fit into said rotated row further comprises:
  dividing an available distance on said imposed document by a distance required by the longest side of said plurality of page cells; and
  determining number of said plurality of rotated page cells that can fit into said area.

5. The method of claim 2 further comprising:
  determining a placement of a plurality of imposition areas relative to each other utilizing a defined gutter distance if said plurality of page cells are clustered; and
  dividing a distance along which said plurality of rotated page cells placement was calculated based on a proportion of a page layout that each section of said imposition layout represents.

6. The method of claim 3 wherein determining said number of said plurality of rotated page cells that can fit into said rotated row further comprises:
  dividing an available distance on said imposed document by a distance required by the longest side of said plurality of page cells; and
  determining number of said plurality of rotated page cells that can fit into said area.

7. A computer implemented system for automatically placing a rotated row in a multi-up imposition, comprising:
  a data-processing apparatus;
  a module executed by said data-processing apparatus, said module and said data-processing apparatus being operable in combination with one another to:
    calculate dimensions for an imposition layout, a plurality of rectangular page cells arranged into rows and columns wherein said plurality of page cells are of a same orientation;
    analyze said dimensions to determine whether a row of rotated page cells can be added to said imposition layout wherein said data-processing apparatus and said module operable in combination with one another to analyze said dimensions to determine whether said row of rotated page cells can be added to said imposition layout are further operable in combination with one another to: determine a largest dimension of said plurality of page cells;
    calculate a minimum distance required to accommodate said plurality of page cells of a same orientation;
    calculate an area available for accommodating said rotated page cells by subtracting said minimum distance from said layout distance on said orientation;
    calculate an available distance for placing a row of rotated page by comparing said area with distance required by shorter dimension of a page description language; and
    analyze whether said available distance is large enough to add said row of rotated page and
    place said row of rotated page cells and said plurality of page cells of a same orientation in said imposition layout.

8. The system of claim 7 wherein said data-processing apparatus and said module operable in combination with one another to determine whether said row of rotated page cells can be added to said imposition layout further are further operable in combination with one another to:
  divide an available distance on said imposed document by a distance required by the longest side of said plurality of page cells; and
  determine a number of said plurality of rotated page cells that can fit into said area.

9. The system of claim 7 wherein said data-processing apparatus and said module are further operable in combination with one another to:
  determine a placement of a plurality of imposition areas relative to each other utilizing a defined gutter distance if said plurality of page cells are clustered; and
  divide a distance along which said plurality of rotated page cells placement was calculated based on a proportion of a page layout that each section of said imposition layout represents.

10. The system of claim 9 wherein said data-processing apparatus and said module operable in combination with one another to determine whether said row of rotated page cells can be added to said imposition layout further are further operable in combination with one another to:
  divide an available distance on said imposed document by a distance required by the longest side of said plurality of page cells; and
  determine number of said plurality of rotated page cells that can fit into said area.

11. The system of claim 7 wherein said data-processing apparatus and said module are further operable in combination with one another to:
  determine a placement of a plurality of imposition areas relative to each other utilizing a defined gutter distance if said plurality of page cells are clustered; and
  divide a distance along which said plurality of rotated page cells placement was calculated based on a proportion of a page layout that each section of said imposition layout represents.

12. The system of claim 10 wherein said data-processing apparatus and said module operable in combination with one another to determine whether said row of rotated page cells can be added to said imposition layout further are further operable in combination with one another to:
   divide an available distance on said imposed document by a distance required by the longest side of said plurality of page cells; and
   determine number of said plurality of rotated page cells that can fit into said area.

13. A non-transitory computer program product for automatically placing a row of rotated page cells in a multi-up imposition, comprising:
   a non-transitory computer-readable storage medium having computer-readable program code means embodied in said medium, said computer-readable program code means comprising:
   computer-readable program code means for calculating dimensions for an imposition layout, a plurality of rectangular page cells arranged into and a plurality of rows and columns, wherein said plurality of page cells are of a same orientation;
   computer-readable program code means for analyzing said dimensions to determine whether a row of rotated page cells can be added to said imposition layout wherein said computer-readable program code means further comprises:
   computer-readable program code means for determining a largest dimension of said plurality of page cells
   computer-readable program code means for calculating a minimum distance required to accommodate said plurality of page cells of a same orientation;
   computer-readable program code means for calculating an area available for accommodating said plurality of rotated page cells by subtracting said minimum distance from said layout distance on said orientation;
   computer-readable program code means for calculating an available distance for placing a rotated row by comparing said area with distance required by shorter dimension of a page description language; and
   computer-readable program code means for analyzing whether said available distance is large enough to add said row of rotated page cells and
   computer-readable program code means for placing said row of rotated page cells and said plurality of page cells of a same orientation in said imposition layout.

14. The non-transitory computer program product of claim 13 wherein said computer-readable program code means further comprises:
   computer-readable program code means for dividing an available distance on said imposed document by a distance required by the longest side of said plurality of page cells; and
   computer-readable program code means for determining number of said plurality of rotated page cells that can fit into said area.

15. The non-transitory computer program product of claim 13 further comprising:
   computer-readable program code means for determining a placement of a plurality of imposition areas relative to each other utilizing a defined gutter distance if said plurality of page cells are clustered; and
   computer-readable program code means for dividing a distance along which said plurality of rotated page cells placement was calculated based on a proportion of a page layout that each section of said imposition layout represents.

16. The non-transitory computer program product of claim 15 wherein said computer-readable program code means for determining said number of said plurality of rotated page cells that can fit into said rotated row further comprises:
   computer-readable program code means for dividing an available distance on said imposed document by a distance required by the longest side of said plurality of page cells; and
   computer-readable program code means for determining number of said plurality of rotated page cells that can fit into said area.

17. The non-transitory computer program product of claim 13 further comprising:
   computer-readable program code means for determining a placement of a plurality of imposition areas relative to each other utilizing a defined gutter distance if said plurality of page cells are clustered; and
   computer-readable program code means for dividing a distance along which said plurality of rotated page cells placement was calculated based on a proportion of a page layout that each section of said imposition layout represents.

* * * * *